July 18, 1961        L. M. HARVEY        2,993,134
PERMANENT MAGNET MOTOR
Filed Jan. 2, 1957
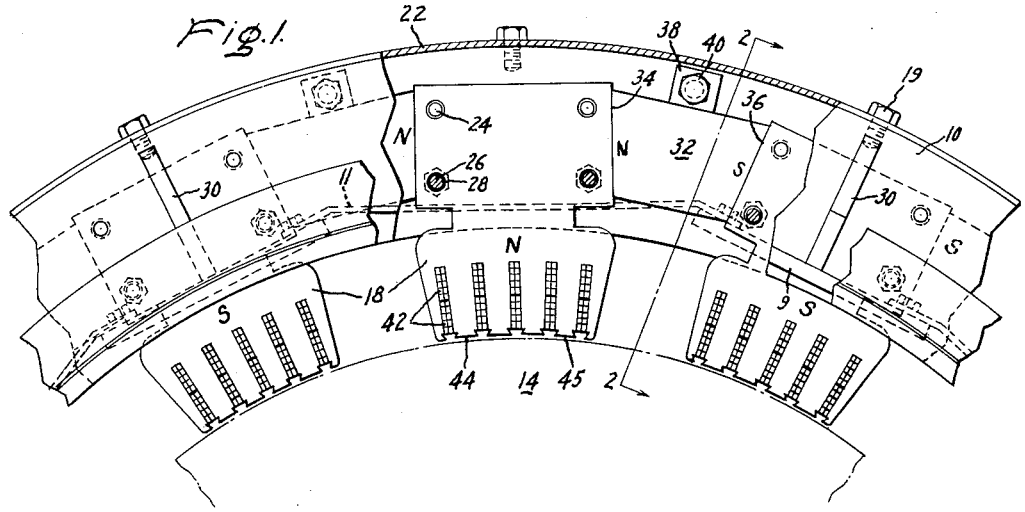
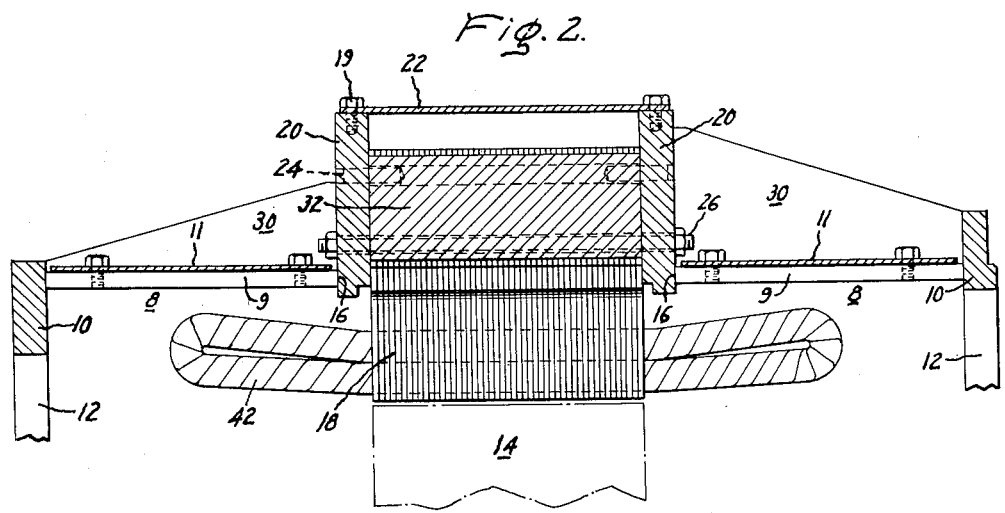
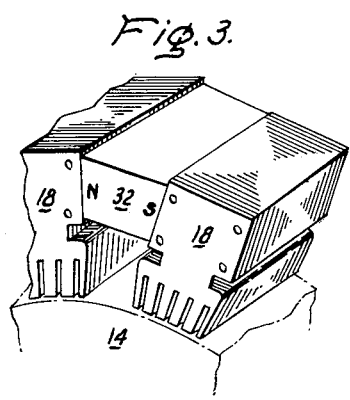
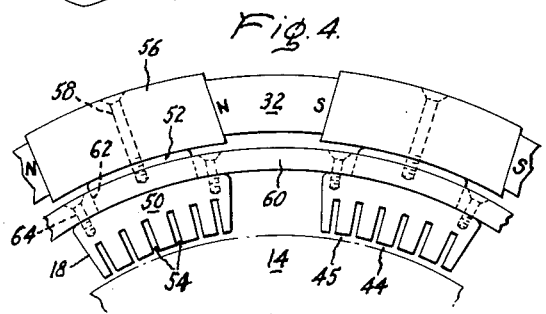
Inventor:
Luke M. Harvey,
by Vernon F. Kalb
His Attorney.

United States Patent Office 2,993,134
Patented July 18, 1961

2,993,134
PERMANENT MAGNET MOTOR
Luke M. Harvey, Schenectady, N.Y., assignor to General Electric Company, a corporation of New York
Filed Jan. 2, 1957, Ser. No. 632,131
4 Claims. (Cl. 310—154)

The invention described herein relates to dynamoelectric machines and more particularly to a motor of the type having a permanently magnetized excitation system.

Permanent magnet machines have been used heretofore as magnetos, motors, generators, and the like, and have been applied to many varied and different uses ranging from providing current for bicycle lamps to serving as exciters for the field windings of A.C. generators. In the usual construction, permanently magnetized magnets, pole pieces and other associated components are assembled to form the machine wherein a magnetic circuit of low reluctance is provided to effectively carry the relatively small amount of flux necessary for proper machine operation. The magnets are magnetized prior to installation because the magnet coercive force is so slight that problems of assembly caused by parts attaching themselves to the magnets, or vice versa, are not encountered. Further, the number of poles and therefore the speed of such machines is generally fixed with variation being obtained in accordance with well known design principles.

To my knowledge however, large permanent magnet motors having rotor diameters varying between twenty-eight and sixty-eight inches have never been designed and constructed. Moreover, motors of this size producing between 150 and 4000 pound feet of torque at one r.p.m. would be rare indeed, in view of the severe limitations of use and the design and assembly problems involved in their production.

In designing such a motor, consideration must be given to the coercive forces inherent in the large size magnets and to the degree of magnetization required for producing the flux necessary to obtain the desired performance. One of the properties of presently available magnet materials, such as magnetic alloys of iron, nickel and aluminum, and cobalt or chrome steels, is that upon removal of the equipment providing magnetization, the magnet loses much of its flux if not retained in a magnetic circuit, and the amount of flux capable of being provided thereafter, decreases considerably. This property of the magnet material is not too important in small motors since slightly larger size magnets can be chosen in order to account for the decay in magnetization after the magnetizing force has been removed. Obviously, the parts must be increased in size, but since the increase is relatively small, the cost of producing such small motors does not rise disproportionately and economical operation is therefore made possible.

However, were this procedure followed in providing stator magnets for large machines of the type disclosed herein, the amount of magnetic material required for producing the desired flux densities would be prohibitive. The magnets therefore must be magnetized in place and by so doing, a savings in material of approximately 50 percent is realized. Further, since the magnets are of considerable size and magnetized to the point of saturation, the coercive force is so great that it is not possible to insert a rotor in the machine in the event the magnets have been previously installed in the stator. The reason is that the rotor is attracted to the poles, and if any two adjacent ones are contacted, the flux linking a section of the rotor is of such high value that it is extremely difficult to effect separation of the elements. In order to overcome this practical problem of installation, it is necessary that the magnets be magnetized after the machine is constructed and the rotor placed therein for operation.

Also, where precision in the control of the angular position of the rotor is required as a necessary factor in successful operation of the machine in an electrical system, permanent magnet motors of this type carry out the function with a very high degree of accuracy. Conventional motors having field coils excited from a separate source of supply are not satisfactory in obtaining the degree of angular precision required since the heat generated by the field coils during machine operation is such that distortion of the structure occurs thereby creating errors which are magnified in the system served by the motor.

A primary object of the invention therefore is to provide an improved permanent magnet motor capable of having the angular position of its rotor adjusted with a high degree of accuracy and precision.

An equally important object of the invention is to provide a motor wherein the magnitude of heat losses are of such small values as to preclude distortion of the machine during operation.

Another object of the invention is the provision of a permanent magnet motor constructed in a manner to permit the magnetization of its field magnets subsequent to their installation in the stator of the machine.

Briefly stated, I carry out the above objects of my invention by providing a slow speed permanent magnet motor having a plurality of field poles located about the inner peripheral surface of a stator. Interposed between each of these field poles and in abutting relationship therewith are bars of magnetic material located in a position wherein they are readily magnetized after being installed in the stator structure in the machine. In order to provide for such magnetization, the outer end of each field pole opposite from the pole face is located in a position wherein it is readily accessible for accepting a connection made with equipment providing the magnetizing force for the magnets.

While the specification concludes with claims particularly pointing out and distinctly claiming the subject matter which I regard as my invention, it is believed the invention will be better understood from the following description taken in connection with the accompanying drawing in which:

FIGURE 1 is a view in elevation with parts broken away showing the arrangement of field poles and magnets provided in the permanent magnet motor;

FIGURE 2 is a view taken on lines 2—2 of FIGURE 1 illustrating the arrangement of side plates for holding the field poles and magnets in position;

FIGURE 3 is a perspective view of a pair of field poles including a magnet of the type illustrated in FIGURE 1; and FIGURE 4 is a modification showing a slightly different way of locating the field poles and magnets in the stator structure.

Referring now to the drawings wherein like reference characters designate like or corresponding parts throughout the several views, there is shown in FIGURES 1–3 a non-magnetic cylindrical frame 8 consisting of alternate plates 9 and screens 11 and being bounded on its ends by circular plates 10 having central openings 12 for receiving the protruding ends of a rotor 14 rotatably mounted within the machine. The cylindrical frame 8 is equipped with openings 16 through which the field poles 18 and non-magnetic cylindrical end plates 20 are inserted. The end plates extend around the peripheral surface of the machine and are arranged to extend downwardly into the opening 16 in frame 8. A non-magnetic cover member 22 encloses and is attached to the outer ends thereof by any appropriate means such as bolts 19. Each of the field poles 18 spaced about the inner peripheral surface of the stator comprise a plurality of magnetic steel laminations rigidly joined to form the pole body which is supported by the non-magnetic end plates 20 positioned on opposite sides thereof. This support is achieved by dowels 24 and bolts 26 provided with oversized holes 28 to obtain radial adjustment of the poles 18 relative to the rotor for obtaining variance in the air gap 28.

In order to lend support and rigidity to each of the field poles 18, axially extending ribs 30 are welded or otherwise secured between circular end plates 10 and 20 respectively.

As previously indicated, the magnets 32 are of relatively large size and are not magnetized prior to being positioned between each of the pole bodies 18. The magnets are trapezoidal in shape, having inwardly directed opposite ends 34 and 36 shaped to contact adjacent sides of field poles 18. As illustrated in FIGURE 2, the magnet sides are in firm contact with the end plates 20 to preclude axial movement, while movement in a radial direction is controlled by a bracket 38 and bolt 40, also extending between and enclosed in the end plates 20.

Armature reaction will occur in the motor and in order to annul the cross magnetization caused by the currents in the rotor or armature windings (not shown), compensating windings 42 are placed in slots provided in the pole face 44 in a manner well known in the art. These windings 42 are in series with the rotor conductors so that the net flux produced by the rotor and pole face windings is so small that the torque constant is not effected except to make it less dependent on current.

Upon assembly of the various components described above, except for attaching cover 22 to the end plates 20, the rotor is placed in position and the magnets are then ready to be magnetized. The process of magnetizing each magnet is well known and merely consists of placing the legs of a U-shaped core on the exposed ends of two adjacent field poles. The number of ampere turns on the core is selected to supply the desired magnetizing force necessary. It will be noted that flux will pass through two parallel magnetic circuits upon energization of the U-shaped core winding; one circuit comprising the U-shaped core, magnet and field poles while the other includes the core, field poles and the rotor. The latter will saturate first because of its greater permeability but this of course will not effect the ability of the magnet and field pole circuit to saturate.

As previously indicated, upon removal of the magnetizing force, if a magnet is removed from the magnetizing circuit it will lose much of its flux and eventually stabilize at a point considerably lower than that at which it was magnetized. This disadvantage is overcome in the structure disclosed herein by leaving the magnets in place thus retaining a high degree of magnetization. The magnetic circuit is not completely closed because of the presence of the motor air gap and this fact will cause the magnets to stabilize at some point lower than the level at which they were magnetized. This decrease in flux density however is slight, as compared with the drop in magnet flux densities if the magnets were completely removed from the magnetic circuit.

The motor structure thus provided permits ready access to the magnets both for magnetization and demagnetization purposes in the event removal of the rotor from the machine is necessary. The heat losses are reduced to a minimum by virtue of the small magnitude of circulating currents and any distortion of the structure as a result of heat imparted to the operative and framing members of the motor occurs only in negligible amounts. Angular accuracy and precision of adjustment of the rotor is thereby made possible to a degree not possible or contemplated by permanent magnet motors of the prior art.

Referring now to the modification shown in FIGURE 4, the field poles 18 are made of two sections instead of the singular construction previously illustrated. Each field pole comprises a pole tip 50 constructed of a plurality of laminations designed to have a reduced neck portion 52 adjacent the outer end thereof. Slots 54 are provided in each pole face 44 for receiving conductors (not shown) as in the previous embodiment. The pole 18 is completed by attaching a section of magnetic steel 56 to the pole tip 50 by bolts 58 or similar securing means.

In order to provide for proper positioning of the field poles 18 in the stator, a cylindrical non-magnetic yoke 60 having rectangular shaped openings 62 for encompassing the neck portion 52 is located intermediate the height of the complete pole 18. The pole tip 50 is attached to the inner surface of yoke 60 by bolts 64 and adjustment of the pole tip in the air gap 45 is obtained by inserting shims between the inner surface of the yoke and the flat portion of the pole tips where bolts 64 are located. As in the previous embodiment, magnets 32 are placed between each of the poles 18 and magnetization of the magnets is then obtained in the maner described above.

It will be apparent that many modifications and variations are possible in light of the above teachings. It therefore is to be understood that within the scope of the appended claims, the invention may be practiced otherwise than as specifically described.

What I claim as new and desire to secure by Letters Patent of the United States is:

1. A stator for a permanent magnet motor comprising a non-magnetic cylinder having openings therein for receiving the outer end of field poles, each of said field poles comprising an inner portion made of a plurality of laminations and an outer portion of solid magnetic material rigidly affixed thereto, a pair of axially spaced cylindrical plates exteriorly affixed to said cylinder and enclosing the outer end of said field poles, means securing said field poles to said plates, a magnet positioned between adjacent field poles and in magnetic communication therewith for providing flux for operation of said motor, said magnets and field poles being positioned in said stator for permitting magnetization of said magnets after installation between said field poles.

2. A stator for a permanent magnet motor comprising a pair of axially spaced circular non-magnetic rings, a plurality of field poles positioned between and circumferentially spaced and disposed about said circular rings such that the inner ends thereof project radially inwardly from the inner surfaces of said rings to define a stator bore adapted for reception of a rotor, framing members positioned axially outward from said circular rings and independent strengthening brackets interconnecting the framing members and circular rings for supplying support and stability to said stator, an initially unmagnetized magnet element positional between adjacent field poles thereby to provide a ring of iron composed of alternating field poles and magnet elements, said magnet elements having their ends placed in full surface contact with the sides of said field poles, each of said field poles also providing an exposed end surface adapted for contact by a magnetizing device for magnetizing said magnet elements and thereby providing flux of sufficient value to obtain operation of said motor.

3. The combination according to claim 2 wherein said field poles are adjustably mounted for movement in said rings in a radial direction to permit obtaining variation in the motor air gap.

4. The combination according to claim 2 wherein the pole face of said field poles is provided with a winding for compensating for armature reaction and thereby preventing demagnetization of said magnets.

References Cited in the file of this patent

UNITED STATES PATENTS

| | | |
|---|---|---|
| 1,444,299 | Benner | Feb. 6, 1923 |
| 2,170,892 | Cox | Aug. 29, 1939 |
| 2,193,406 | Goss | Mar. 12, 1940 |
| 2,248,272 | Jurak | July 8, 1941 |

FOREIGN PATENTS

| | | |
|---|---|---|
| 373,561 | Great Britain | May 26, 1932 |
| 724,192 | Great Britain | Feb. 16, 1955 |
| 935,200 | Germany | Dec. 15, 1955 |

UNITED STATES PATENT OFFICE
CERTIFICATE OF CORRECTION

Patent No. 2,993,134                                          July 18, 1961

Luke M. Harvey

It is hereby certified that error appears in the above numbered patent requiring correction and that the said Letters Patent should read as corrected below.

Column 4, line 63, for "positional" read -- positioned --.

Signed and sealed this 13th day of March 1962.

(SEAL)
Attest:

ERNEST W. SWIDER
Attesting Officer

DAVID L. LADD
Commissioner of Patents